July 23, 1968     C. E. SMITH, JR     3,394,244
ELECTRONIC CIRCUIT FOR CONTROLLING HEAT SEALING DEVICES
Filed Sept. 13, 1965

INVENTOR.
CHARLES E. SMITH, Jr.
BY
*Max Schwartz*
ATTORNEY

United States Patent Office 3,394,244
Patented July 23, 1968

3,394,244
ELECTRONIC CIRCUIT FOR CONTROLLING
HEAT SEALING DEVICES
Charles E. Smith, Jr., North Providence, R.I., assignor to Thermoplastic Industries, Inc., Brockton, Mass., a corporation of Massachusetts
Filed Sept. 13, 1965, Ser. No. 486,780
29 Claims. (Cl. 219—243)

ABSTRACT OF THE DISCLOSURE

A sealing apparatus for plastic materials having a sealing wire mounted on a platen and a control circuit for controlling the charge of capacitors and the discharge of at least one through the sealing wire. The control circuit is provided with a rectifier to transform alternating current to pulsating direct current, and a potentiometer for adjusting the charge desired on a first capacitor. A second capacitor in the circuit is discharged at the closing of a switch to trigger a silicon controlled rectifier which allows the first capacitor to discharge through the sealing wire. A second switch is provided whereby the first capacitor is discharged without affecting the sealing wire.

My present invention relates to a new method of sealing plastics and/or plastic coated materials by means of an electronic device for controlling and utilizing the discharge from a capacitor or bank of capacitors.

The principal object of the present invention is to provide an electronic circuit using solid state devices for controlling the discharge from a capacitor for heating a wire for the joining or cutting of plastics and/or plastic coated materials.

Another object of the present invention is to provide an electronic circuit for the heat sealing of plastics and/or plastic coated materials which controls a capacitor discharge thus eliminating the need of a separate timing of the heat cycle.

A further object of the present invention is to provide an electronic circuit for the heat sealing of plastics and/or plastic coated materials which uses a capacitor discharge which is of much shorter duration than other conventional means and results in increased machine speed, protection of the heating element, and elimination of moving parts and contacts.

Another object of the present invention is to provide an electronic circuit using controlled discharge of a capacitor for applying a heat seal to plastics and/or plastic coated materials which allows a build up of the charging current over a period of time and thereby greatly reduces the drain on the A.C. service.

A further object of the present invention is to provide an electronic circuit where the heat sealing of plastic or plastic coated materials which is readily adjustable to the magnitude of the desired heat cycle without the use of costly tapped transformers or variable transformers.

With the above and other objects and advantageous features in view, my invention consists of a novel arrangement of parts, more fully disclosed in the detailed description following, in conjunction with the accompanying drawings, and more particularly defined in the appended claims.

Heat sealing of plastics and/or plastic coated materials is normally accomplished by the use of a Nichrome wire mounted on a base such as Teflon. The parts to be joined are positioned on a similar base. The wire and base are brought down over the material and in contact with it, and an electrical impulse is passed through the wire to heat the same. In sealing large quantities or large objects, there is a great deal of drain on the plant current, to the extent that it effects the other operations in the plant. The current is hard to control, and if it should be triggered while the Nichrome wire is in mid air and not in heat sealing position, the expensive wire will dissolve and explode. The devices now in use are comparatively costly and slow. The present invention provides an electronic circuit using solid state means for eliminating substantially all of the moving parts. The device of the present invention utilizes controlled charging and controlled discharging of a capacitor, or even a bank of capacitors, to provide the necessary current. The result is a virtual elimination of many of the defects of the conventional systems now in use.

Figure 1:
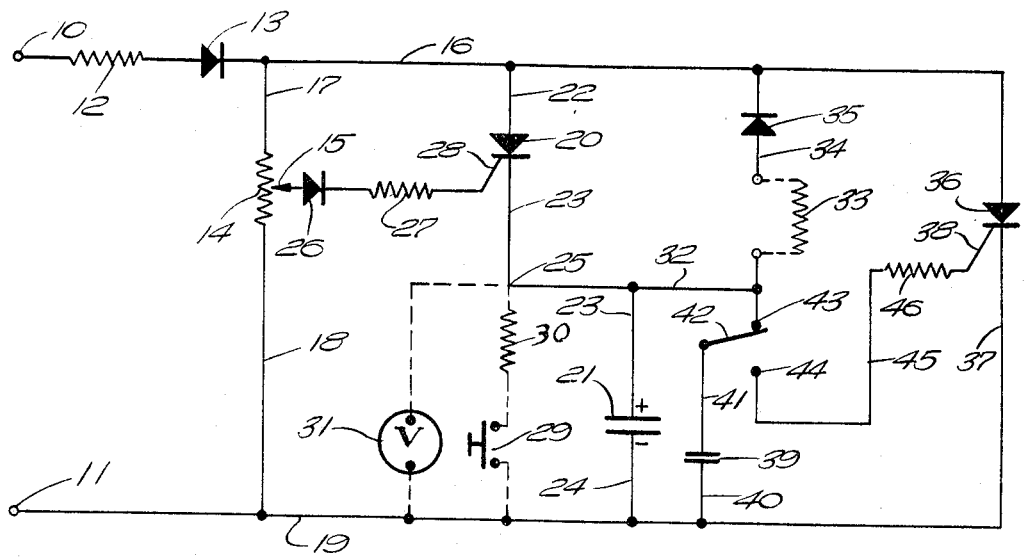
FIG. 1 is a circuit diagram of a device embodying my invention.

Referring more in detail to the circuit as illustrated in FIG. 1, an alternating voltage limited only by the ratings of the various components used in the circuit is applied to the terminals 10 and 11. From the terminal 10 the current passes through a resistor 12. The resistor 12 has two important functions. It limits the charging current through the silicon controlled rectifier to the capacitor as hereinafter described. Also, by the proper selection of resistor 12, one may control the rate of charge of the capacitor. Therefore, where time is not a factor, the line current requirements at 10 and 11 can be limited. From the resistor 12, the current passes through a rectifier 13 which changes the A.C. current to a positive pulsing D.C. which is present across the various components hereinafter described. The first component is a potentiometer 14 mounted across the voltage and which acts as a divider whose wiper point 15 can be adjusted to any voltage level from zero to the full voltage across the points 10 and 11. The potentiometer 14 is connected to the line 16 from the rectifier 13 at one end by a line 17 and is connected at the other end through a line 18 to the negative line 19 leading to the A.C. pole 11.

Parallel to the potentiometer 14, a silicon controlled rectifier 20 and a capacitor 21 are mounted across the voltage lines 16 and 19 inseries, a line 22 connecting the line 16 with one side of the silicon controlled rectifier 20, a line 23 connecting the other side of the rectifier 20 with one side of the capacitor 21, and a line 24 connecting the other side of the capacitor 21 with the voltage line 19. This hookup forms another divider in which a point 25 on the line 23 between the rectifier 20 and capacitor 21 has a voltage potential depending on the state of charge of the capacitor 21.

The current picked up by the potentiometer 14 and its wiper point 15 passes through a rectifier 26 and a resistor 27 in series to the gate 28 of the silicon controlled rectifier 20. Now if the wiper point 15 is more positive during any half cycle than the point 25, a current will flow through rectifier 26 and resistor 27 to the gate 28, causing the silicon controlled rectifier 20 to conduct during this half cycle until the voltage at the point 25 is equal to the voltage at the point 15. This provides a means of setting the voltage to which we wish to charge the capacitor 21.

When the capacitor 21 is fully charged, it is possible for an attempt to be made to lower the voltage by moving the wiper point 15. This may result in the point 15 becoming negative with respect to the point 25 and causing a reverse discharge of the capacitor towards the point 15.

This would damage the gate 28 of the rectifier 20. Therefore, the rectifier 26 is interposed in the line to prevent a reverse flow of current and thus protect the gate 28 of the silicon controlled rectifier 20. The resistance 27 is also designed to protect the gate 28 by limiting the current through the gate to a safe value as specified by the manufacturer of the device. Now assuming further that it is actually desirable to lower the voltage at the point 15 at a time when the capacitor 21 has not discharged. With the rectifier 26 in the position indicated, lowering of the voltage at the point 15 will have no effect whatsoever on the capacitor 21. In such cases, a push button 29 may be inserted in the dotted line position illustrated in FIG. 1 between the point 25 and the voltage line 19 across the capacitor 21. A protective resistance 30 may be positioned in line with the push button 29. Now if the button 29 is pushed, it immediately discharges the capacitor 21. A volt meter 31 is similarly placed between the point 25 and line 19 to indicate the state of charge of the capacitor 21 and thus enable the operator to determine the optimum conditions for a particular work load.

If desired, the switch 29 hereinabove described may be of the momentary type, since it requires a very little contact to discharge the capacitor 21. The switch 29 can readily be made part of the potentiometer 14 and more particularly its wiper arm 15 so that pressure on the wiper arm 15 to change its setting will automatically set off the switch 29. Such constructions are conventional.

Now the capacitor 21 is connected through its line 23 to another line 32 leading to the work load 33 which may be in the form of a Nichrome wire for severing or joining plastic materials. The other side of the work load 33 is connected to a line 34 with a rectifier 35 and voltage line 16. The rectifier 35 is in reverse condition and prevents charging current from passing in reverse order through the load to the capacitor 21. In effect it is a one way valve to allow only discharge of the capacitor 21 through the load. Now the voltage line 16 reaches another silicon controlled rectifier 36 in series in a line 37 between the lines 16 and 19. However the capacitor 21 cannot discharge through the load 33 and rectifier 35 until current is passing through the silicon controlled rectifier 36 line 37 back to the line 19. This is controlled by the gate 38 on the rectifier 36. Operation on the gate 38 is by current built up at a small capacitor 39 mounted in parallel with the capacitor 21. One line 40 connects the capacitor 39 to the line 19 and the other line 41 is connected to a switch 42 normally in contact with the point 43, line 32 and line 25. Thus, as the capacitor 21 becomes charged so does the small capacitor 39 become similarly charged by the same charging current. Now when the switch 42 is operated to move from the contact 43 to the contact 44, this contact is connected through a line 45 and resistance 46 to the gate 38 of the rectifier 36. There is then sufficient current in the capacitor 39 to operate the gate 38 and allow flow of current through the rectifier 36. This will cause a discharge of the capacitor 21 through the load 33.

Operation of the unit is now obvious. The alternating current applied at points 10 and 11 is rectified at 13 to provide a pulsing D.C. current. With the potentiometer 14 set at the desired charge, the current flows through the silicon controlled rectifier 20 through the line 23 to the capacitor 21 and charges the same until there is a balance between the point 25 on the line 23 and the point 15 on the potentiometer 14. At this point the silicon controlled rectifier 20 shuts off. Now the capacitor 39 has also been charged through the normally close contacts of the switch 42 connected to the contact 43 as illustrated. This capacitor is of a small value as compared to the capacitor 21 and is used only for the purpose of triggering the silicon controlled rectifier 36. When the switch 42 is operated by the machine or any other device, the capacitor 39 is transferred to the gate of the silicon controlled rectifier 36 and discharges through the current limiting resistor 46 and the gate 38. This causes the rectifier 36 to conduct.

When the silicon controlled rectifier 36 conducts, it does two things. First it allows the capacitor 21 to discharge through the load and the rectifier 35. This performs the desired work. Secondly, it clamps off the charging voltage across the potentiometer 14 and lines 17 and 18 thus preventing the capacitor 21 from recharging during the working of the device. When the capacitor 21 has discharged to a low value and the resultant current flow through the load, the rectifier 35 and the silicon controlled rectifier 36 reaches the minimum holding current specified by the manufacturer of the rectifier 36, this rectifier will regain its blocking state. This removes the clamp across the potentiometer 14 and the charging cycle begins again.

In many applications, the switch 42 may still be closed at this time because in normal heat sealing operations, the switch will be placed in such a position that the heat sealing element comes in contact with the material to be sealed or cut at the end of the stroke of the switch 42. When the switch 42 operates a discharge cycle is initiated. It is common practice to allow the heat sealing element to remain in contact after the sealing cycle for a period of time to allow cooling. This is known as dwell time. With this in mind, it becomes evident that by using a separate capacitor 39 to trigger the silicon controlled rectifier 36, even though the switch 42 is still in operation in contact with the point 44, there is no further effect on the silicon controlled rectifier 36 after its initial firing. Therefore, the silicon controlled rectifier 36 can regain its blocking condition as described earlier, and allows the capacitor 21 to begin to charge even though the switch 42 is still in contact with its point 44. As for the capacitor 39, being of very small value, its charge time when the switch 42 is finally opened is almost instantaneous.

The above arrangement therefore permits rapid charging and discharging of the capacitor 21 without regard to the position of the switch 42 and thus speeds the cycle. The value of the various units will of course depend on the current and the necessary capacities required. In a normal operation, for example, the resistance 12 may be 10 ohms the resistance 27 may be 1000 ohms the resistance 46 may also be 1000 ohms and, if the switch 29 is used, the resistance 30 may also be 1000 ohms. The potentiometer 14 may be 15,000 ohms. The capacitor 21 may be any desired unit from 1 mfd. to infinity. The capacitor 39 is extremely small being only .25 mfd.

Figure 2:
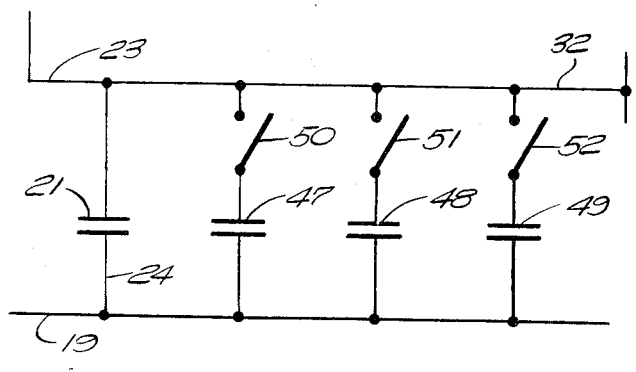
FIG. 2 is a circuit diagram of a portion of the circuit shown in FIG. 1 showing the use of a plurality of capacitors.

It is apparent that there are two factors which control the current passing through the work load 33 and the quality of the work performed. The first is the level of voltage in the capacitor 21, the second is the amount of capacity represented by the capacitor 21. FIG. 1 shows the position of the capacitor 21 in the circuit. Needless to say the capacitor 21 may be a single capacitor of a given value or a bank of capacitors as illustrated in FIG. 2. Referring to FIG. 2, the line 23 leading to capacitor 21 is shown as elongated before it reaches line 32 to the work load. This allows for the addition of a bank of capacitors 47, 48 and 49 each mounted in parallel with the capacitor 21 across the lines 23 and 19. Furthermore, each capacitor 47, 48 and 49 is provided with a switch 50, 51 and 52 between each capacitor and the line 23. These switches can be set up to be operated in any desired manner either individually or en masse. Thus the capacity of the capacitor 21 can be selectively increased or decreased as desired through the bank of capacitors as illustrated in FIG. 2. However, in the circuit illustrated, they will all discharge simultaneously to the work load 33.

Figure 3:
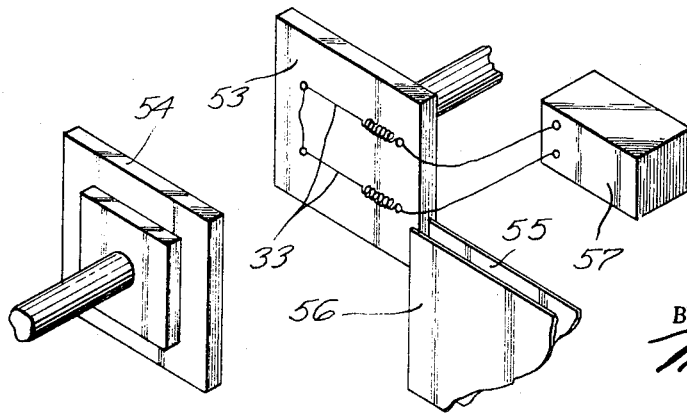
FIG. 3 is a schematic perspective view of a plastic sealing device utilizing the circuit of the present invention.

FIG. 3 is a schematic illustration of a plastic sealing apparatus embodying the circuit of FIGS. 1 and 2. This type of apparatus usually comprises a pair of platens 53 and 54, the platen 53 having the sealing wire 33 mounted on its face. The plastic or plastic coated sheets 55 and 56 are inserted between the platens 53 and 54. When the platens are pressed together a pulse is passed through the wire 33 from the circuit of FIGS. 1 and 2, shown as 57, and a seal is effected.

The above arrangement eliminates all moving parts and contacts with the exception of the switch 42 which controls a signal of milliamperes magnitude. This switch under such light duty would be expected to have a life equal to its mechanical rather than electrical limits. However, if necessary, the switch 42 can be replaced by any conventional solid state switch actuated by light, magnetism or proximity. The present invention thus eliminates the timing of the heat cycle and distributes the charging current over a period of time thereby eliminating the momentary high drain on the plant service. The small inexpensive potentiometer 14 eliminates costly transformers or variable transformers. Furthermore, the Nichrome wires are comparatively easily damaged or destroyed by conventional methods. The present invention provides a capacitor discharge heat cycle of such short duration that even accidental discharge at normal operating values in the open position will not result in the destruction of the wire. The hookup is simple and the units are comparatively inexpensive resulting in a compact inexpensive unit. Other advantages of the present invention will be readily apparent to a person skilled in the art.

I claim:

1. An electronic device for controlling the charge and discharge of a capacitor through a work load, comprising a positive and negative line, a source of alternating current applied to said lines, a rectifier in said positive line for transforming said A.C. to a positive pulsating D.C., a silicon controlled rectifier and a capacitor in series between said positive and negative lines, means for applying a current to the gate of said silicon controlled rectifier to cause it to conduct current from said positive line to said capacitor, a work load and a second rectifier in series between said capacitor and said positive line whereby said capacitor can discharge through said work load and second rectifier but said positive current cannot pass through said second rectifier to said work load and capacitor, a second silicon controlled rectifier between said positive and negative lines, and means for applying a current to the gate of said second silicon controlled rectifier to cause current to flow between said positive and negative lines and to cause said capacitor to discharge through the work load and said second rectifier.

2. An electronic device as in claim 1, wherein a resistance is in series between the source of A.C. and said rectifier in said positive line, said resistance limiting the current to said silicon controlled rectifier and controlling the time of charging said capacitor.

3. An electronic device as in claim 1, wherein said means for applying a current to the gate of said silicon controlled rectifier includes a potentiometer between said positive and negative lines, and an adjustable wiper for selecting the voltage to the gate of said silicon controlled rectifier and to said capacitor.

4. An electronic device as in claim 1, wherein a rectifier and a resistor are mounted in series between said current applying means and said gate of said silicon controlled rectifier.

5. An electronic device as in claim 1, wherein said capacitor comprises a plurality of capacitors in parallel with each other, and means for selectively joining said capacitors to the circuit.

6. An electronic device as in claim 1, wherein a push button switch is mounted in a by-pass line around said capacitor, whereby said capacitor may be discharged without affecting the work load.

7. An electronic device as in claim 1, wherein a resistor is in series between said gate of said second silicon controlled rectifier and said current applying means for said gate.

8. An electronic device as in claim 1, wherein said current applying means for said gate of said second silicon controlled rectifier comprises a small capacitor mounted in parallel with said capacitor, and a switch for directing the charge from said small capacitor to the gate of said second silicon controlled rectifier.

9. An electronic device as in claim 2, wherein said means for applying a current to the gate of said silicon controlled rectifier includes a potentiometer between said positive and negative lines, and an adjustable wiper for selecting the voltage to the gate of said silicon controlled rectifier and to said capacitor.

10. An electronic device as in claim 3, wherein, a rectifier and a resistor are mounted in series between said wiper and said gate of said silicon controlled rectifier.

11. An electronic device as in claim 2, wherein a rectifier and a resistor are mounted in series between said current applying means and said gate of said silicon controlled rectifier.

12. An electronic device as in claim 9, wherein a rectifier and a resistor are mounted in series between said wiper and said gate of said silicon controlled rectifier.

13. An electronic device as in claim 9, wherein said capacitor comprises a plurality of capacitors in parallel with each other, and means for selectively joining said capacitors to the circuit.

14. An electronic device as in claim 12, wherein said capacitor comprises a plurality of capacitors in parallel with each other, and means for selectively joining said capacitors to the circuit.

15. An electronic device as in claim 9, wherein a push button switch is mounted in a by-pass line around said capacitor, whereby said capacitor may be discharged without affecting the work load.

16. An electronic device as in claim 12, wherein a push button switch is mounted in a by-pass line around said capacitor, whereby said capacitor may be discharged without affecting the work load.

17. An electronic device as in claim 10, wherein a resistor is in series between said gate of said second silicon controlled rectifier and said current applying means for said gate.

18. An electronic device as in claim 12, wherein a resistor is in series between said gate of said second silicon controlled rectifier and said current applying means for said gate.

19. An electronic device as in claim 7, wherein said current applying means for said gate of said second silicon controlled rectifier comprises a small capacitor mounted in parallel with said capacitor, and a switch for directing the charge from said small capacitor to the gate of said second silicon controlled rectifier.

20. An electronic device as in claim 18, wherein said current applying means for said gate of said second silicon controlled rectifier comprises a small capacitor mounted in parallel with said capacitor, and a switch for directing the charge from said small capacitor to the gate of said second silicon controlled rectifier.

21. An apparatus for sealing plastic and/or plastic coated materials comprising a platen or a pair of platens, a sealing wire mounted on the face of one of said platens, and means for passing an electrical pulse through said wire when said platens are pressed against the material or together over the materials to effect a seal, said means comprising a capacitor, and a solid state circuit controlling the charge and discharge of said capacitor, said electrical pulse means comprising a positive and negative line, a source of alternating current applied to said lines, a rectifier in said positive line for transforming said A.C. to a positive pulsating D.C., a silicon controlled rectifier and a capacitor in series between said positive and negative lines, means for applying a current to the gate of said silicon controlled rectifier to cause it to conduct current from said positive line to said capacitor, and a solid state circuit controlling the discharge of said capacitor through said sealing wires.

22. An apparatus as in claim 21, wherein said solid state control circuit comprises a second rectifier in series with said sealing wire between said capacitor and said positive line whereby said capacitor can discharge through said sealing wire and second rectifier but said positive current cannot pass through said second rectifier to said sealing wire and capacitor, a second silicon controlled rectifier between said positive and negative lines, and means for applying a current to the gate of said second silicon controlled rectifier to cause current to flow between said positive and negative lines and to cause said capacitor to discharge through said sealing wire and second rectifier.

23. An apparatus as in claim 21, wherein said capacitor comprises a plurality of capacitors in parallel with each other, and means for selectively joining said capacitors to the circuit.

24. An apparatus as in claim 21, wherein said means for applying a current to the gate of said silicon controlled rectifier includes a potentiometer between said positive and negative lines, and an adjustable wiper for selecting the voltage to the gate of said silicon controlled rectifier and to said capacitor.

25. An apparatus as in claim 21, wherein a resistance is in series between the source of A.C. current and said rectifier in said positive line, said resistance limiting the current to said silicon controlled rectifier and controlling the time of charging said capacitor.

26. An apparatus as in claim 22, wherein said current applying means for said gate of said second silicon controlled rectifier comprises a small capacitor mounted in parallel with said capacitor, and a switch for directing the charge from said small capacitor to said gate of said second silicon controlled rectifier.

27. An apparatus as in claim 21, wherein a rectifier and a resistor are mounted in series between said current applying means and said gate of said silicon controlled rectifier.

28. An apparatus as in claim 21, wherein a push button switch is mounted in a by-pass line around said capacitor, whereby said capacitor may be discharged without affecting said sealing wire.

29. An apparatus as in claim 22, wherein a resistor is in series between said gate of said second silicon controlled rectifier and said current applying means for said gate.

References Cited
UNITED STATES PATENTS

| | | | |
|---|---|---|---|
| 2,509,439 | 5/1950 | Langer | 219—243 X |
| 3,113,198 | 12/1963 | Shinn | 219—501 X |

RICHARD M. WOOD, *Primary Examiner.*

C. L. ALBRITTON, *Assistant Examiner.*